United States Patent
Morita et al.

(10) Patent No.: US 6,239,215 B1
(45) Date of Patent: May 29, 2001

(54) POWDER COATING COMPOSITION

(75) Inventors: Hirokazu Morita; Tatsuo Fujii; Hiroyuki Shiraki, all of Osaka (JP)

(73) Assignee: Takeda Chemical Industries, Ltd., Osaka (JP)

( * ) Notice: Subject to any disclaimer, the term of this patent is extended or adjusted under 35 U.S.C. 154(b) by 0 days.

(21) Appl. No.: 09/274,337

(22) Filed: Mar. 23, 1999

(30) Foreign Application Priority Data

Mar. 26, 1998 (JP) .................................................. 10-100455

(51) Int. Cl.[7] .......................... C09D 5/03; C09D 163/00; C09D 167/00; C09D 151/04
(52) U.S. Cl. ................. 525/65; 525/64; 525/74; 525/78
(58) Field of Search .................. 525/64, 65, 74, 525/78

(56) References Cited

U.S. PATENT DOCUMENTS 5,346,954 * 9/1994 Wu .

FOREIGN PATENT DOCUMENTS

| 0 750 023 A1 | 12/1996 | (EP) . |
| 8-48704 | 2/1996 | (JP) . |
| 10-259323 | 9/1998 | (JP) . |

OTHER PUBLICATIONS

Wicks, Organic Coating Science and Technology p. 486–507.*

* cited by examiner

Primary Examiner—David J. Buttner
(74) Attorney, Agent, or Firm—Wenderoth, Lind & Ponack, L.L.P.

(57) ABSTRACT

A powder coating composition comprising a multilayer polymer particle, in which at least one inner layer is a polymer layer having a glass transition temperature (Tg) of not over 20° C. and the outermost layer is a polymer layer having a Tg of not less than 60° C. and, the monomer components forming the polymer layer having a Tg of not over 20° C. are those having an unsaturated double bond in the molecule, and among the monomer components, a crosslinking monomer and a grafting monomer are used, respectively, within the ranges of 0.3 to 5 weight % and of 1 to 10 weight %, is dispersed in an amount of 1 to 30 parts by weight per 100 parts by weight of the total components other than the multilayer polymer particle can show excellent dispersibility to various powder coatings and can improve workability and impact resistance of a coat film while maintaining inherent characteristics of a powder coating such as appearance of a coat film and an anti-blocking property.

17 Claims, No Drawings

POWDER COATING COMPOSITION

FIELD OF THE INVENTION

The present invention relates to a thermosetting powder coating composition excellent in workability such as flexibility and flexing resistance, and impact resistance.

BACKGROUND OF THE INVENTION

In recent years, in consideration of environmental disruption of global scale such as destroying the ozone layer, global warming and acid rain, measures against environmental pollution of the earth has been advocated. At the same time, from the viewpoint of environmental protection, various control have been made by the governments of many countries. In such circumstances, releasing organic solvents in the air has become a big problem and, consequently the tendency to use no solvent has become remarkable in many industries. Also in the coating industry, powder coatings have been placed with many hopes to become substitutes of conventional solvent-type coatings. The coat film performance of such powder coatings, however, is not satisfactory comparing with that of the solvent-type coatings.

The powder coatings are advantageous over the solvent-type coatings, in that they are free from solvents and a thick coat film having a thickness of 30 to 500 μm can be formed by one coating operation. On the other hand, they are problematic in that a coat film becomes thick, so that workability of the coat film deteriorates. Polyester-type powder coatings have been employed in the fields where weather resistance is required such as road materials and construction materials. In recent years, in view of the maintenance-free coatings, a polyester-type powder coatings with much higher weather resistance have been investigated. However, such highly weather-resistant polyester-type powder coatings also have a problem that workability of the coat film deteriorates. As coatings for precoated metal which are subjected to working such as bending, punching and embossing after coating, epoxy-type and polyester-type powder coatings have been widely investigated, and demand for development of powder coatings which can endure severe processing conditions after coating has been increased. Although all of the powder coatings of the above types have become to have coat film performances close to those of the solvent-type coatings, it is, in fact, hard to say that they have balanced toughness of a coat film, such as workability and impact resistance, performance of a coat film, such as appearance and weather resistance, and powder characteristics such as an anti-blocking property.

On the other hand, multilayer polymer particles represented by a core-shell polymer in which a core is composed of a rubbery polymer and a shell is composed of a glassy polymer have heretofore been known. Examples in which such a core-shell polymer is applied to a powder coating are disclosed in Japanese Examined Patent Publication Nos. 25709/1987 and 12926/1997 (corresponding to EP 0 750 023 A1).

The Japanese Examined Patent Publication No. 25709/1987 discloses a technique relating to an epoxy resin composition for a powder coating which is excellent in impact resistance, the composition comprising 3 to 35 parts by weight of a rubber obtained by graft polymerization of rubber particles containing not less than 50% of toluene-insoluble components with epoxy acrylate, a monoethylenic glycidyl ester and an ethylenic monomer. With respect to this technique, however, ring-opening and crosslinking reactions of an epoxy group easily take place during manufacture or storage of the particles due to high reactivity between glycidyl groups originated from the monoethylenic glycidyl ester. As a result, there is a problem that dispersibility to a powder coating and appearance of a coating film deteriorate.

The Japanese Examined Patent Publication No. 12926/1997 discloses a technique relating to a thermosetting powder coating composition excellent in impact resistance and chipping resistance, the composition comprising a (meth) acrylic copolymer having a glycidyl group, a multivalent carboxylic acid compound and rubber particles having a core with a glass transition temperature (Tg) of not over 20° C. and a glycidyl group-free shell having a Tg of not less than 40° C. In this technique, core-shell particles obtained without using either crosslinking monomers or grafting monomers during its manufacture and a commercially available impact modifier are used. Since, although an improving effect on impact resistance and chipping resistance can be observed, there is no satisfactory effect on improvement in workability of a coat film and an anti-blocking property of the powder coating may deteriorate, there is a problem that its application range is limited.

In consideration of the above problems, the object of the present invention is to provide a powder coating composition which can show excellent dispersibility to various powder coatings and which can improve workability and impact resistance of a coat film while maintaining original characteristics of a powder coating such as appearance of a coat film and an anti-blocking property.

SUMMARY OF THE INVENTION

The present inventors have intensively investigated to overcome the above-mentioned problems, and as a result, they have accomplished the present invention on the basis of the finding that a powder coating composition characterized in that a multilayer polymer particle in which at least one inner layer is a polymer layer having a glass transition temperature (Tg) of not over 20° C. and the outermost layer is a polymer layer having a Tg of not less than 60° C. and, monomer components forming the polymer layer of a Tg of not over 20° C. are those having an unsaturated double bond in the molecule, and among the monomer components, a crosslinking monomer and a grafting monomer are used, respectively, within the ranges of 0.3 to 5 weight % and of 1 to 10 weight %, is dispersed in an amount of 1 to 30 parts by weight per 100 parts by weight of the total components other than the multilayer polymer particles has excellent workability of a coat film and impact resistance while maintaining characteristics of a powder coating such as appearance of a coat film and an anti-blocking property.

Thus, the present invention includes:

(1) a powder coating composition comprising a multilayer polymer particle in which at least one inner layer is a polymer layer having a glass transition temperature (Tg) of not over 20° C. and the outermost layer is a polymer layer having a Tg of not less than 60° C. and, monomer components forming the polymer layer having a Tg of not over 20° C. are those having an unsaturated double bond in the molecule, and among the monomer components, a crosslinking monomer and a grafting monomer are used, respectively, within the ranges of 0.3 to 5 weight % and of 1 to 10 weight %, is dispersed in an amount of 1 to 30 parts by weight per 100 parts by weight of the total components other than the multilayer polymer particles;

(2) the powder coating composition as described in the above (1), wherein the outermost layer of the multilayer polymer particle is modified with 0.5 to 35 weight % of a monomer having at least one carboxyl group or hydroxyl group in its molecule;

(3) the powder coating composition as described in the above (1) or (2), wherein the powder coating is a polyester-based powder coating;

(4) the powder coating composition as described in the above (1) or (2), wherein the powder coating is an acrylic-based powder coating;

(5) the powder coating composition as described in the above (1) or (2), wherein the powder coating is an epoxy-based powder coating;

(6) the powder coating composition as described in the above (1) or (2), wherein the powder coating is an epoxy-polyester hybrid-based powder coating;

(7) the powder coating composition as described in any one of the above (1) to (6), wherein a weight average particle diameter of the multilayer polymer particle is 0.05 to 5 μm; and (8) the powder coating composition as described in any one of the above (1) to (6), wherein a proportion of the polymer layer having a Tg of not over 20° C. contained in the multilayer polymer particle is 30 to 98 weight % per the whole multilayer polymer particles.

DETAILED DESCRIPTION

The present invention will be described in detail below.

The multilayer polymer particle used in the present invention can be obtained by a continuous multi-stages emulsion polymerization technique in which monomers in a later stage are subjected to seed polymerization in order in the presence of polymer particles formed in the preceding stage. Seed latex is prepared first, monomers for forming the first layer are then added and subjected to seed polymerization to synthesize the first layer. Subsequently, monomers for forming the second layer are added and subjected to seed polymerization to synthesize the second layer. After repeating these operations one after another, a desired multilayer polymer particle can be obtained by adding monomers for forming the outermost layer and polymerizing the outermost layer. A number of inner layers in the multilayer polymer particle is no limited, but generally 1 to 3, preferably 1 or 2. The production of the multilayer polymer particle will be described in detail below.

First of all, the first polymerization of seed particles is conducted by adding monomers suitable for desired characteristics in a lump. Methyl methacrylate and ethyl acrylate are preferably employed as a monomer component which is not restricted to these compounds of course.

The multilayer polymer particle used in the present invention has at least one inner layer which is a polymer layer having a glass transition temperature (Tg) of not over 20° C. and has the outermost layer which is a layer having a Tg of not less than 60° C. Among monomer components forming the layer having a Tg of not over 20° C., a crosslinking monomer and a grafting monomer are used, respectively, within the ranges of 0.3 to 5 weight % and of 1 to 10 weight % per the multilayer polymer particles.

The polymer layer having a Tg of not over 20° C. is formed by subjecting the monomers for forming the polymer to seed polymerization in the presence of seed latex or multilayer polymer latex formed in the preceding stage.

The glass transition temperature (Tg) in the present invention is calculated according to the formula (1):

$$1/Tg = \Sigma W_n Tg_n \quad (1)$$

where $Tg_n$ is a Tg of a homopolymer of each monomer forming the copolymer expressed in terms of absolute temperature and $W_n$ is a weight fraction of each monomer forming the copolymer, is used. The $Tg_n$ of a homopolymer of each monomer used in the formula (1) is, for example, 233K (−40° C.) for butyl acrylate and 403K (130° C.) for methyl methacrylate.

As a monomer to be used in seed polymerization of the polymer layer having a Tg of not over 20° C., any monomer which has at least one unsaturated double bond in its molecule and can form a polymer having a Tg of not over 20° C. is applicable. For example, conjugated dienes such as butadiene, isoprene and chloroprene and alkyl acrylates such as ethyl acrylate, propyl acrylate, butyl acrylate, cyclohexyl acrylate, isononyl acrylate and 2-ethylhexyl acrylate can be listed. Among them, butadiene, butyl acrylate and 2-ethylhexyl acrylate are preferably used. In addition, unless a Tg of copolymer exceeds 20° C., a monomer which is copolymerizable with the above monomers such as aromatic vinyl compounds, e.g. styrene, vinyltoluene and α-methylstyrene; aromatic vinylidenes; vinyl cyanates, e.g. acrylonitrile and methacrylonitrile; vinylidene cyanate; alkyl methacrylates, e.g. methyl methacrylate and butyl methacrylate; and aromatic (meth)acrylates, e.g. benzyl acrylate, benzyl methacrylate and phenoxyethyl acrylate may be copolymerized. Among these copolymerizable monomers, styrene, acrylonitrile and methyl methacrylate are preferably employed.

In the polymerization of the polymer layer having a Tg of not over 20° C. in the present invention, predetermined amounts of a crosslinking monomer and a grafting monomer which are copolymerizable monomers are used as essential components in addition to the above-mentioned monomers. The amount of the crosslinking monomer used is 0.3 to 5 weight %, preferably 0.35 to 3 weight %, based on the monomers for forming the polymer having a Tg of not over 20° C. The amount of the grafting monomer is 1 to 10 weight %, preferably 1 to 5 weight %, based on the monomers for forming the polymer layer having a Tg of not over 20° C. If the amounts of the crosslinking monomer and/or the grafting monomer used are less than the lower limits, appearance of a coat film, pulverizability and an anti-blocking property of a powder coating are deteriorated, and satisfactory workability can not be obtained. If the amounts of the crosslinking monomer and/or the grafting monomer are larger than the upper limits, it becomes difficult to obtain an improving effect on workability and impact resistance of a coat film obtained.

The crosslinking monomer used in the present invention is a monomer having at least two unsaturated double bonds of the same type in its molecule, and examples thereof include aromatic divinyl compounds such as divinylbenzene, alkane polyol polyacrylates and alkane polyol polymethacrylates such as ethylene glycol diacrylate, ethylene glycol dimethacrylate, butylene glycol diacrylate, butylene glycol dimethacrylate, hexanediol diacrylate, hexanediol dimethacrylate, oligoethylene glycol diacrylate, oligoethylene glycol dimethacrylate, trimethylolpropane diacrylate, trimethylolpropane triacrylate and trimethylolpropane trimethacrylate. In particular, butylene glycol diacrylate and hexanediol diacrylate are preferably employed.

The grafting monomer used in the present invention is a monomer having at least two unsaturated double bonds of different reactivity in its molecule, and examples thereof include unsaturated carboxylic acid allyl esters such as allyl acrylate, allyl methacrylate, diallyl maleate, diallyl fumarate and diallyl itaconate. In particular, allyl methacrylate is preferably employed.

A proportion of the polymer layer having a Tg of not over 20° C. in the multilayer polymer particles used in the present invention is 30 to 98 weight %, preferably 50 to 95 weight % and more preferably 70 to 90 weight %, based on the total multilayer polymer particles. If the proportion of the polymer layer having a Tg of not over 20° C. is less than these values, a desired improving effect on workability and impact resistance may not be obtained. If the proportion of that polymer layer is more than those values, the dispersibility in the resin components constituting the powder coating may be lowered, so that a desired improving effect on workability and impact resistance sometimes are not obtained. In addition, blocking of a powder coating may become easy to occur after pulverization and storage stability of the powder coating may deteriorate.

Polymerization of the outermost layer having a Tg of not less than 60° C. can be performed by, first, preparing a latex according to the method of preceding stage as mentioned above and then, conducting seed polymerization of a monomer for forming the polymer layer having a Tg of not less than 60° C. in the presence of the latex. By such polymerization, the polymer layer having a Tg of not less than 60° C. can be formed.

The monomer used in the seed polymerization of the outermost layer having a Tg of not less than 60° C. may be any monomer capable of forming the polymer layer having a Tg of not less than 60° C. For example, alkyl methacrylates such as methyl methacrylate, ethyl methacrylate and cyclohexyl methacrylate and aromatic vinyl compounds such as styrene can be used. Among these, methyl methacrylate and styrene are preferably employed. In addition, a monomer copolymerizable with the above monomers, such as alkyl acrylates, e.g. ethyl acrylate and butyl acrylate, alkyl methacrylates, e.g. ethyl methacrylate and butyl methacrylate, aromatic vinyl compounds, e.g. vinyltoluene and α-methylstyrene, aromatic vinylidenes, vinyl cyanates, e.g. acrylonitrile and methacrylonitrile and vinylidene cyanates, may be copolymerized as long as it can make a Tg not less than 60° C. Among these comonomers, ethyl acrylate and acrylonitrile are particularly preferably employed.

In the same manner as in the polymerization of the polymer having a Tg of not over 20° C., a crosslinking monomer may be used as the monomer used in the seed polymerization of the outermost layer having a Tg of not less than 60° C. In such an instance, crosslinking monomers which are the same as those for forming the polymer layer having a Tg of not over 20° C. can be employed as the crosslinking monomer.

Workability and impact resistance can be further improved by modification of the outermost layer composed of the polymer having a Tg of not less than 60° C. with a monomer having a functional group with reactivity to a base resin of a powder coating or to a curing agent, such as a carboxyl group and a hydroxyl group.

As examples of the monomer having a carboxyl group, there may be mentioned acrylic acid, methacrylic acid, maleic acid and itaconic acid. As examples of the monomer having a hydroxyl group, there may be mentioned 2-hydroxyethyl methacrylate, 2-hydroxypropyl methacrylate and 2-hydroxybutyl methacrylate. Among these monomers having a carboxyl group and monomers having a hydroxyl group, methacrylic acid and 2-hydroxyethyl methacrylate are preferably used, respectively.

The amount of such a monomer having a functional group used is 0.5 to 35 weight %, preferably 1 to 30 weight % and more preferably 2 to 25 weight %, based on the monomers forming the outermost layer composed of the polymer having a Tg of not less than 60° C. If the amount of the monomer having a functional group is more than the above limit, separation of the multilayer polymer particles from the latex becomes difficult, and in addition, dispersibility to a powder coating may remarkably deteriorates.

A weight average particle diameter of the multilayer polymer particle thus polymerized is usually 0.05 to 5 μm, preferably 0.1 to 1 μm. If the particle diameter is less than the above lower limit, a melt viscosity of a powder coating may increase and good appearance of a coat film sometimes can not be obtained. On the other hand, the particle diameter is larger than the above upper limit, a desired improving effect on workability and impact resistance sometimes can not be obtained.

The term "a weight average particle diameter of a particle diameter" used in the present invention means a weight average particle diameter per multilayer polymer particle in a latex state in the production of the multilayer polymer particles which can be determined, for example, by a dynamic light scattering method using a dynamic light scattering measuring machines manufactured by OTSUKA ELECTRONICS Co., Ltd. (LPA-3000/LPA-3100).

The multilayer polymer particles of the present invention can be obtained in the form of a granule, a flake or a powder by once freezing the multilayer polymer latex obtained by the above-mentioned method, thawing it, separating the polymer particles, centrifugally dehydrating and drying. Among those, the spray drying method is preferably employed and in the method, a weight average particle diameter is 10–60 μm, preferably, 15–50 μm, more preferably, 20–40 μm.

Examples of a polymerization initiator which is used in the polymerization of the multilayer polymer particles of the present invention include polymerization initiators of persulfate type such as sodium persulfate and potassium persulfate, initiators of azo type such as azobis (isobutyronitrile), 2,2'-azobis(2-amidinopropane) dihydrochloride, 2,2'-azobis(2-(2-imidazoline-2-yl) propane) and dimethyl methylpropaneisobutyrate, and initiators of organic peroxide type such as cumene hydroperoxide and diisopropylbenzene hydroperoxide.

As examples of a surfactant used, there may be mentioned anionic surfactants such as sodium dodecylbenzenesulfonate and sodium dioctylsultosuccinate and nonionic surfactants such as polyoxyethylene nonylphenylether and polyoxyethylene monostearate.

The powder coating composition of the present invention comprises a base resin, a curing agent, a multilayer polymer particle, a pigment and various additives which constitute a powder coating. An amount of the multilayer polymer particles used is usually 1 to 30 parts by weight, preferably 2 to 20 parts by weight, and more preferably 2 to 15 parts by weight per 100 parts by weight of the total components other than the multilayer polymer particles. If the amount of the multilayer polymer particles is less than these values, an improving effect on workability is sometimes not obtained. On the other hand, if it is more than those values, a smooth coat film sometimes can not be obtained and appearance may deteriorate because of the increase in a melt viscosity.

The powder coating used in the present invention may be a polyester-based powder coating which includes a polyester resin as a base resin or a base ingredient, an acrylic-based powder coating which includes an acrylic resin as a base resin, an epoxy-based powder coating which includes an epoxy resin as a base resin, an epoxy-polyester hybrid-based powder coating which comprises an epoxy resin and a polyester resin as base resins, and powder coatings which contain a phenol resin, a urea resin, a melamine resin or the like as a base resin. Among these powder coatings, the polyester-based powder coating, the acrylic-based powder coating, the epoxy-based powder coating and the epoxy-polyester hybrid-based powder coating are preferably employed.

The polyester-based powder coating used in the present invention is not particularly limited as long as it is a polyester-based powder coating used by those skilled in the art. For example, polyester resins, which have two or more hydroxyl groups per molecule, a softening point ranging from 60° C. to 150° C. and a number average molecular weight ranging from 1,000 to 20,000, are preferably used as a base resin. In this case, the curing agent is not particularly limited, and curing agents which are conventionally used such as aliphatic, aromatic or alicyclic isocyanates, e.g. hexamethylene diisocyanate, xylylene diisocyanate and isophorone diisocyanate; adducts of these isocyanates with compounds having an active hydrogen group; and blocked isocyanates obtained by blocking an isocyanate group in the above compounds with a blocking agent such as methanol, isopropanol and β-caprolactam can be employed. As the compound having an active hydrogen group, there can be mentioned low molecular weight compounds such as ethylene glycol, butylene glycol, trimethylolpropane, glycerin, ethylenediamine and hexamethylenediamine, and various high molecular weight compounds such as polyols, polyesters, polyethers and polyamides. Non-blocked isocyanates having a urethodione linkage also can be employed. The polyester-based powder coating used in the present invention also includes a system in which a polyester resin having at least two carboxyl groups per molecule is cured with 1,3,5-triglycidyl isocyanurate (TGIC) and a system in which cured with an acrylic resin having a glycidyl group.

The epoxy-based powder coating used in the present invention is not particularly limited as long as it is an epoxy-based powder coating used by those skilled in the art. For example, epoxy resins, which have two or more epoxy groups per molecule, a number average molecular weight ranging from 700 to 2,800, a weight per epoxy equivalent ranging from 600 to 2,000 and a softening point ranging from 60° C. to 150° C. and which are in a solid state at normal temperature, are preferably used as a base resin. In this case, the curing agent is not particularly limited, and the curing agents which are conventionally used such as aliphatic amines, e.g. ethylenediamine, diethylenetriamine and triethylenetetramine, aromatic amines, e.g. m-xylylenediamine, m-phenylenediamine and p-phenylenediamine, acid anhydrides, e.g. phthalic anhydride, tetrahydrophthalic anhydride and trimellitic anhydride can be employed. In addition, a polyester resin having at least two carboxyl groups per molecule may be used together with the above-mentioned curing agent.

In the same manner as the afore-mentioned polyester-based and epoxy-based powder coatings, the acrylic-based powder coating used in the present invention is also not particularly limited as long as it is a powder coating which is called an acrylic-based powder coating by those skilled in the art. For example, (meth)acrylic copolymers having a softening point ranging from 60° C. to 150° C., which are synthesized by copolymerization of a monomer of (meth) acrylate type and a monomer of (meth)acrylate type having a glycidyl group in its molecule, are preferably used as a base resin. In this case, the curing agent is not particularly limited, and curing agents which are conventionally used such as acid anhydrides, e.g. phthalic anhydride, tetrahydrophthalic anhydride and trimellitic anhydride, dicarboxylic acids, e.g. dodecanedicarboxylic acid, and dicyandiamide can be employed. In addition, a polyester resin having at least two carboxyl groups per molecule can be used as the curing agent.

The acrylic-based powder coating, used in the present invention, includes a system in which an acrylate base resin having at least two hydrogen groups per molecule is cured with an isocyanate curing agent such as blocked isocyanate, non-blocked isocyanate including urethodione compound.

In the same manner as the afore-mentioned polyester-based, epoxy-based and acrylic-based powder coatings, the epoxy-polyester hybrid-based powder coating used in the present invention is also not particularly limited as long as it is a powder coating which is called an epoxy-polyester hybrid-based powder coating by those skilled in the art. For example, a powder coating obtainable by blending a polyester resin having at least two carboxyl groups per molecule and an epoxy resin having at least two epoxy groups per molecule and curing them is preferably employed. In this case, the powder coating containing more than 30 weight % of polyester resin is generally employed.

In addition to the above-mentioned base resin and curing agent, various additives such as curing accelerators, pigments, e.g. titanium dioxide, flow modifiers, e.g. acrylic oligomer and silicone, antifoaming agents, e.g. benzoin, antioxidants and ultraviolet absorbers may be blended to the powder coating used in the present invention.

The powder coating composition of the present invention is usually produced by blending the multilayer polymer particle of the present invention, the afore-mentioned base resin, curing agent and, according to demand, various additives using a manufacturing machine widely used by those skilled in the art, then melt-kneading the mixture at a temperature higher than a softening point of the base resin, generally, 50–130° C., preferably, 60–110° C., and if necessary, conducting pulverization and classification.

Alternatively, it can be produced by compounding or dispersing the multilayer polymer particle in monomers which have not been used for synthesizing a base resin yet or oligomers under synthesis and then synthesizing the base resin, or by, after the completion of synthesizing the base resin, melt-kneading the multilayer polymer particle and the base resin to prepare a base resin, the multilayer polymer particle being dispersed therein, then blending the base resin, a curing agent and various additives, subsequently melt-kneading the mixture, and then conducting pulverization and classification.

In the dry blending of the powder coating composition of the present invention, various mixers such as a Henschel mixer, a Banbury mixer, a high speed mixer and a Nauta mixer can be employed. As an apparatus used for melt-kneading, there can be exemplified a heat roll, a heat kneader and an extruder and the like. As a pulverizer, impact mills such as a hammer mill and a pin mill are used. As a classifier, a vibratory screen and the like are used.

The weight average particle diameter of thus obtained powder coating is not particularly limited, and generally, 10–100 μm, preferably, 20–80 μm.

A coat film can be formed by applying the powder coating composition obtained by the above-mentioned manufacturing method to a substrate by a conventional coating technique such as electrostatic spray coating and fluidized bed coating, and then heating it at a temperature higher than the softening point of the base resin, generally, 100–280° C., preferably, 130–240° C.

The substrate to be applied with the present powder coatings includes, for instance, metal such as iron, zinc, tin, stainless steel, copper and aluminum, inorganic material such as glass, those surface-treated with plastisol, ferric phosphate, zinc phosphate and the like, and coated with a primer or an undercoating.

Thickness of the coat film is not particularly limited, and generally, about 15 μm–1 mm, preferably, about 30–300 μm.

EXAMPLE

The present invention is illustrated by the following production examples, examples and comparative examples below, but its scope is not limited by these examples at all. The word "part(s)" used in all production examples, examples and comparative examples means "part(s) by weight". Abbreviations used in the production examples, the examples and the comparative examples are as follows:

| Monomers | |
|---|---|
| n-Butyl acrylate | BA |
| Methyl methacrylate | MMA |
| Ethyl acrylate | EA |
| Styrene | St |
| 1,4-Butylene glycol diacrylate | BGA |
| Allyl methacrylate | A1MA |
| 2-Hydroxyethyl methacrylate | HEMA |
| Methacrylic acid | MAA |
| Itaconic acid | IA |
| Glycidyl methacrylate | GMA |
| Surfactant | |
| Neocol P (Dai-ichi Kogyo Seiyaku Co., Ltd.) | NP |
| Others | |
| Deionized water | DIW |
| Sodium hydrogen carbonate | SBC |
| Sodium persulfate | SPS |

In the calculation of a Tg of each layer by the use of the formula (1), the following values are used as a Tg of a homopolymer of each monomer.

| | |
|---|---|
| BA | −40° C. |
| MMA | 130° C. |
| EA | −24° C. |
| St | 105° C. |
| BGA | 100° C. |
| A1MA | 100° C. |
| HEMA | 55° C. |
| MAA | 228° C. |
| IA | 150° C. |
| GMA | 46° C. |

Method of measuring particle diameter: A particle diameter was measured by a dynamic light scattering method using dynamic light scattering measuring machines (LPA-3000/LPA-3100) manufactured by OTSUKA ELECTRONICS Co., Ltd.

Production Example 1

Production of Multilayer Polymer Particle A

A 2-liter polymerization vessel equipped with a reflux condenser was charged with 506 g of DIW, 2.5 g of a 1% aqueous solution of NP and 16.4 g of a 1% aqueous solution of SBC and the mixture was heated to 70° C. while stirring it under a nitrogen stream. After elevating temperature, 8 g of EA was added to the mixture, and after further stirring for 10 minutes, 4.1 g of a 2% aqueous solution of SPS was added to the mixture. The resulting mixture was stirred for 1 hour to give a seed latex. Subsequently, 51 g of a 2% aqueous solution of SPS was added to the mixture at 70° C., and then a monomer emulsion for forming the first layer comprising 631 g of BA, 13.4 g of BGA, 26.9 g of A1MA, 408 g of a 1% aqueous solution of NP, and 68 g of a 1% aqueous solution of SBC was continuously fed to the resulting mixture over a period of 240 minutes. After the completion of feeding the emulsion, the mixture was stirred at 70° C. for 60 minutes to be subjected to an aging reaction. Then, while maintaining the mixture at 70° C., 7.2 g of a 2% aqueous solution of SPS was added to the mixture, and then a monomer emulsion for forming the second layer comprising 107 g of MMA, 12 g of EA, 1.2 g of BGA, 48 g of a 1% aqueous solution of NP and 12 g of a 1% aqueous solution of SBC was continuously fed to the resulting mixture over a period of 150 minutes. After the completion of feeding the emulsion, the mixture was heated to 80° C., and stirred for 60 minutes to be subjected to an aging reaction. After the completion of the aging reaction, the mixture was cooled to 30° C. and filtered through a 300-mesh stainless steel sieve to give a latex of a multilayer polymer particle A having a weight average particle diameter of 0.53 μm.

The latex was once frozen at −30° C. Then, it was thawed and subjected to dehydration and washing by a centrifugal dehydration machine. The resultant was dried in a current of air at 60° C. overnight to give the multilayer polymer particle A. Tgs of the multilayer polymer particle A calculated by the formula (1) are −35° C. for the first layer and 106° C. for the second layer.

Production Example 2

Production of Multilayer Polymer Particle B

In the same manner as Production Example 1 except that the monomer emulsion for forming the second layer was changed to that comprising 99 g of MMA, 12 g of EA, 1.2 g of BGA. 8.0 g of HEMA, 48 g of a 1% aqueous solution of NP and 12 g of a 1% aqueous solution of SBC, a multilayer polymer particle B was prepared. A weight average particle diameter of the multilayer polymer particle B was 0.49 μm. Tgs of the multilayer polymer particle B calculated by the formula (1) are −35° C. for the first layer and 101° C. for the second layer.

Production Example 3

Production of Multilayer Polymer Particle C

In the same manner as Production Example 1 except that the monomer emulsion for forming the second layer was changed to that comprising 83 g of MMA, 12 g of EA, 1.2 g of BGA, 24 g of HEMA, 48 g of a 1% aqueous solution of NP and 12 g of a 1% aqueous solution of SBC, a multilayer polymer particle C was prepared. A weight average particle diameter of the multilayer polymer particle C was 0.48 μm. Tgs of the multilayer polymer particle C calculated by the formula (1) are −35° C. for the first layer and 91° C. for the second layer.

Production Example 4

Production of Multilayer Polymer Particle D

In the same manner as Production Example 1 except that the monomer emulsion for forming the first layer was changed to that comprising 544 g of BA, 1.9 g of BGA, 5.5 g of A1MA, 336 g of a 1% aqueous solution of NP and 56 g of a 1% aqueous solution of SBC and the monomer emulsion for forming the second layer was changed to that comprising 214 g of MMA, 24 g of EA, 2.4 g of BGA, 48 g of a 1% aqueous solution of NP and 16 g of a 1% aqueous solution of SBC, a multilayer polymer particle D was prepared. A weight average particle diameter of the multilayer polymer particle D was 0.48 μm. Tgs of the multilayer polymer particle D calculated by the formula (1) are −39° C. for the first layer and 106° C. for the second layer.

Production Example 5

Production of Multilayer Polymer Particle E

A 2-liter polymerization vessel equipped with a reflux condenser was charged with 456 g of DIW, 12.8 g of a 1% aqueous solution of NP and 32 g of a 1% aqueous solution of SBC and the mixture was heated to 70° C. while stirring it under a nitrogen stream. After elevating temperature, 32 g of EA was added to the mixture. After further stirring for 10 minutes, 64 g of a 2% aqueous solution of SPS was added to the resulting mixture. The resultant was stirred for 10 minutes to give a seed latex. Subsequently, a monomer emulsion for forming the first layer comprising 593 g of BA, 3.0 g of BGA, 12.2 g of A1MA, 227 g of a 1% aqueous solution of NP and 32 g of a 1% aqueous solution of SBC was continuously fed over a period of 180 minutes at 70° C. After the completion of feeding the emulsion, the mixture was stirred at 70° C. for 60 minutes to be subjected to an aging reaction. Then, while maintaining the mixture at 70° C., 16 g of a 2% aqueous solution of SPS was added to the mixture and a monomer emulsion for forming the second layer comprising 144 g of MMA, 16 g of EA, 48 g of a 1% aqueous solution of NP and 16 g of a 1% aqueous solution of SBC was continuously fed to the resulting solution over a period of 60 minutes. After the completion of feeding the emulsion, the mixture was heated to 80° C., and stirred for 60 minutes to be subjected to an aging reaction. After the completion of the aging reaction, the mixture was cooled to 30° C. and filtered through a 300-mesh stainless steel sieve to give a latex of a multilayer polymer particle E having a weight average particle diameter of 0.25 μm. After that, conducting the same operations as Production Example 1, the multilayer polymer particle E was obtained. Tgs of the multilayer polymer particle E calculated by the formula (1) are −38° C. for the first layer and 107° C. for the second layer.

Production Example 6

Production of Multilayer Polymer Particle F

In the same manner as Production Example 1 except that the monomer emulsion for forming the second layer was changed to that comprising 99 g of MMA, 12 g of EA, 1.2 g of BGA, 8.0 g of MAA, 48 g of a 1% aqueous solution of NP and 12 g of a 1% aqueous solution of SBC, a multilayer polymer particle F was prepared. A weight average particle diameter of the multilayer polymer particle F was 0.49 μm. Tgs of the multilayer polymer particle F calculated by the formula (1) are −35° C. for the first layer and 111° C. for the second layer.

Production Example 7

Production of Multilayer Polymer Particle G

In the same manner as Production Example 1 except that the monomer emulsion for forming the second layer was changed to that comprising 91 g of MMA, 12 g of EA, 1.2 g of BGA, 16 g of IA, 48 g of a 1% aqueous solution of NP and 12 g of a 1% aqueous solution of SBC, a multilayer polymer particle G was prepared. A weight average particle diameter of the multilayer polymer particle G was 0.51 μm. Tgs of the multilayer polymer particle G calculated by the formula (1) are −35° C. for the first layer and 109° C. for the second layer.

Production Example 8

Production of Multilayer Polymer Particle H

In the same manner as Production Example 1 except that the monomer emulsion for forming the first layer was changed to that comprising 67.2 g of BA, 564 g of St, 13.4 g of BGA, 26.9 g of A1MA, 272 g of a 1% aqueous solution of NP and 68 g of a 1% aqueous solution of SBC and that the emulsion for forming the first layer was fed over a period of 360 minutes at 80° C., a multilayer polymer particle H was prepared. A weight average particle diameter of the multilayer polymer particle H was 0.48 μm. Tgs calculated by the formula (1) are 83° C. for the first layer and 106° C. for the second layer.

Production Example 9

Production of Multilayer Polymer Particle I

In the same manner as Production Example 1 except that the monomer emulsion for forming the second layer was changed to that comprising 119 g of EA, 1.2 g of BGA, 48 g of a 1% aqueous solution of NP and 12 g of a 1% aqueous solution of SBC, a multilayer polymer particle I was prepared. A weight average particle diameter of the multilayer polymer particle I was 0.49 μm. Tgs calculated by the formula (1) are −35° C. for the first layer and −23° C. for the second layer.

Production Example 10

Production of Multilayer Polymer Particle J

In the same manner as Production Example 1 except that the monomer emulsion for forming the first layer was changed to that comprising 672 g of BA, 227 g of a 1% aqueous solution of NP and 32 g of a 1% aqueous solution of SBC and that the monomer emulsion for forming the second layer was changed to that comprising 108 g of MMA, 12 g of EA, 48 g of a 1% aqueous solution of NP and 16 g of a 1% aqueous solution of SBC, a multilayer polymer particle J was prepared. A weight average diameter of the multilayer polymer particle J was 0.53 pm. Tgs calculated by the formula (1) are −40° C. for the first layer and 106° C. for the second layer.

Production Example 11

Production of Multilayer Polymer Particle K

In the same manner as Production Example 5 except that the monomer emulsion for forming the first layer was changed to that comprising 604 g of BA, 1.2 g of BGA, 3.2 g of A1MA, 227 g of a 1% aqueous solution of NP and 32 g of a 1% aqueous solution of SBC, a multilayer polymer particle K was prepared. A weight average diameter of the multilayer polymer particle K was 0.25 μm. Tgs of the multilayer polymer particle K calculated by the formula (1) are −39° C. for the first layer and 107° C. for the second layer.

Production Example 12

Production of Multilayer Polymer Particle L

In the same manner as Production Example 1 except that the monomer emulsion for forming the first layer was changed to that comprising 658 g of BA, 13.4 g of BGA, 408 g of a 1% aqueous solution of NP and 68 g of a 1% aqueous solution of SBC and that the monomer emulsion for forming the second layer was changed to that comprising 99 g of MMA, 12 g of EA, 1.2 g of BGA, 8.0 g of GMA, 48 g of a 1% aqueous solution of NP and 12 g of a 1% aqueous solution of SBC, a multilayer polymer particle L was prepared. A weight average diameter of the multilayer polymer particle L was 0.49 μm. Tgs calculated by the formula (1) are −35° C. for the first layer and 98° C. for the second layer.

Component ratios in the multilayer polymer particles A to L prepared by Production Examples 1 to 12, Tgs of layers included in each polymer particle and particle diameters of each polymer particle are summarized in Table 1.

Decane dicarboxylic acid (DDA): manufactured by Ube Industries, Ltd.

ARALDITE PT-810: triglycidyl isocyanurate manufactured by Ciba-Geigy A. G.

Curing Catalyst

TTP: triphenyl phosphine

ARALDITE DT-312: catalyst for curing triglycidyl isocyanurate produced by Ciba-Geigy A. G.

Flow Modifier

Acronal 4F: manufactured by BASF Pigment

TIPAQUE CR-90: titanium dioxide manufactured by ISHIHARA SANGYO KAISHA, LTD.

Example 1

Ten parts of the multilayer polymer particle A prepared in Production Example 1, a resin, a curing agent, a catalyst, a flow modifier and a pigment were blended in a compounding ratio given in Table 2 using a high-speed mixer, and then melt-kneaded in an extruder at 120° C. After cooling, the

TABLE 1

Polymerization compositions of multilayer polymers particles

| | | Production example 1 | Production example 2 | Production example 3 | Production example 4 | Production example 5 | Production example 6 | Production example 7 | Production example 8 | Production example 9 | Production example 10 | Production example 11 | Production example 12 |
|---|---|---|---|---|---|---|---|---|---|---|---|---|---|
| Multilayer polymer | | A | B | C | D | E | F | G | H | I | J | K | L |
| First layer (weight %) | BA | 94 | 94 | 94 | 98.65 | 99.3 | 94 | 94 | 10 | 94 | 100 | 99.3 | 98 |
| | St | | | | | | | | 84 | | | | |
| | BGA | 2 | 2 | 2 | 0.35 | 0.5 | 2 | 2 | 2 | 2 | | 0.2 | 2 |
| | AlMA | 4 | 4 | 4 | 1 | 2 | 4 | 4 | 4 | 4 | | 0.5 | |
| Tg of first layer (° C.) | | −35 | −35 | −35 | −39 | −38 | −35 | −35 | 83 | −35 | −40 | −39 | −35 |
| Second layer (weight %) | MMA | 89 | 82.3 | 69.0 | 89 | 90 | 82.3 | 76 | 89 | | 90 | 90 | 82.3 |
| | EA | 10 | 10 | 10 | 10 | 10 | 10 | 10 | 10 | 99 | 10 | 10 | 10 |
| | BGA | 1 | 1 | 1 | 1 | | 1 | 1 | 1 | 1 | | | 1 |
| | HEMA | | 6.7 | 20.0 | | | | | | | | | |
| | MAA | | | | | | 6.7 | | | | | | |
| | IA | | | | | | | 13 | | | | | |
| | GMA | | | | | | | | | | | | 6.7 |
| Tg of second layer (° C.) | | 106 | 101 | 91 | 106 | 107 | 111 | 109 | 106 | −23 | 106 | 107 | 98 |
| First layer/Second layer (weight %) | | 85/15 | 85/15 | 85/15 | 70/30 | 80/20 | 85/15 | 85/15 | 85/15 | 85/15 | 80/15 | 85/20 | 85/15 |
| Particle diameter (μm) | | 0.53 | 0.49 | 0.48 | 0.48 | 0.25 | 0.49 | 0.51 | 0.48 | 0.49 | 0.53 | 0.25 | 0.49 |

Constituent ingredients of the powder coatings used in Examples of the present invention are as follows:

Base Resins

EPICLON 4055RP: epoxy resin manufactured by DAINIPPON INK AND CHEMICALS, INC.

FINEDIC M-8050: hydroxyl group-terminated polyester resin manufactured by DAINIPPON INK AND CHEMICALS, INC.

FINEDIC A-224S: glycidyl group-containing acrylic resin manufactured by DAINIPPON INK AND CHEMICALS, INC.

UPICACOAT GV-230: carboxylic acid-terminated polyester resin manufactured by Japan U-PICA Co., Ltd.

Curing Agents

Adipic acid dihydrazide (ADH): manufactured by Japan Hydrazine Industrial Co., Inc.

UPICACOAT GV-230: carboxylic acid-terminated polyester resin manufactured by Japan U-PICA Co., Ltd.

VESTAGON B-1530: blocked isocyanate manufactured by Huls A. G.

resulting mixture was finely ground by a pulverizer, and a fraction which passed through a 150-mesh sieve was collected to give an epoxy-based powder coating composition, the multilayer polymer particle A dispersing therein. A coated plate was produced by applying the powder coating composition obtained to a cold rolled steel plate by electrostatic powder coating so that a thickness of a coat film would become 50 to 70 μm, and curing it under a baking condition of at 190° C. for 20 minutes.

Example 2

An epoxy-polyester hybrid-based powder coating composition, 10 parts of the multilayer polymer particle A being dispersed therein, was produced in the same manner as Example 1 except for changing a melt-kneading temperature in an extruder to 110° C. A coated plate was produced by applying the powder coating composition obtained to a cold rolled steel plate by electrostatic powder coating so that a thickness of a coat film would become 50 to 70 μm, and curing it under a baking condition of at 170° C. for 20 minutes.

Example 3

A polyester-based powder coating composition, 10 parts of the multilayer polymer particle A being dispersed therein, was produced in the same manner as Example 1 except that a melt-kneading temperature in an extruder was changed to 110° C. and an amount of the multilayer polymer particle A added was changed to 5 parts. A coated plate was produced by applying the powder coating composition obtained to a cold rolled steel plate by electrostatic powder coating so that a thickness of a coat film would become 50 to 70 μm, and curing it under a baking condition of at 190° C. for 20 minutes.

Examples 4 and 5

Polyester-based powder coating compositions and coated plates were produced in the same manner as Example 3 except for adding 10 parts of the multilayer polymer particle A in Example 4 and adding 20 parts of the multilayer polymer particle A in Example 5.

Example 6

A acrylic-based powder coating composition, 10 parts of the multilayer polymer particle A being dispersed therein, was produced in the same manner as Example 1 except for changing a melt-kneading temperature in an extruder to 110° C. A coated plate was produced by applying the powder coating composition obtained to a cold rolled steel plate by electrostatic powder coating so that a thickness of a coat film would become 50 to 70 μm, and curing it under a baking condition of at 170° C. for 20 minutes.

Examples 7 to 9

Polyester-based powder coating compositions and coated plates were produced in the same manner as Example 3 except for in Example 7 adding 5 parts of the multilayer polymer particle B, in Example 8 adding 10 parts of the multilayer polymer particle B and in Example 9 adding 20 parts of the multilayer polymer particle B, respectively, in place of the multilayer polymer particle A.

Examples 10 to 12

Polyester-based powder coating compositions and coated plates were produced in the same manner as in Example 3 except for in Example 10 adding 10 parts of the multilayer polymer particle C, in Example 11 adding 10 parts of the multilayer polymer particle D and in Example 12 adding 10 parts of the multilayer polymer particle E, respectively, in place of the multilayer polymer particle A.

Example 13

A polyester-based powder coating composition, 10 parts of the multilayer polymer particle F being dispersed therein, was produced in the same manner as Example 1 except for changing a melt-kneading temperature in an extruder to 110° C. A coated plate was produced by applying the powder coating composition obtained to a cold rolled steel plate by electrostatic powder coating so that a thickness of a dried coat film would become 50 to 70 μm, and curing it under a baking condition of at 200° C. for 20 minutes.

Example 14

A polyester-based powder coating composition and a coated plate were produced in the same manner as Example 13 except for changing adding 10 parts of the multilayer polymer particle G in place of the multilayer polymer particle F.

Comparative Example 1

An epoxy-based powder coating composition and a coated plate were produced in the same manner as in Example 1 except that no multilayer polymer particle A was added.

Comparative Example 2

An epoxy-polyester hybrid-based powder coating composition and a coated plate were produced in the same manner as in Example 2 except that no multilayer polymer particle A was added.

Comparative Example 3

A polyester-based powder coating composition and a coated plate were produced in the same manner as in Example 3 except that no multilayer polymer particle A was added.

Comparative Example 4

An acrylic-based powder coating composition and a coated plate were produced in the same manner as in Example 6 except that no multilayer polymer particle A was added.

Comparative Example 5

A polyester-based powder coating composition and a coated plate were produced in the same manner as in Example 13 except that no multilayer polymer particle F was added.

Comparative Examples 6 to 8

A polyester-based powder coating compositions and coated plates were produced in the same manner as in Example 3 except that 10 parts of the multilayer polymer particles H to J were added, respectively, in place of the multilayer polymer particle A.

Comparative Example 9

An acrylic-based powder coating composition and a coated plate were produced in the same manner as in Example 6 except that 10 parts of the multilayer polymer particle J was added in place of the multilayer polymer particle A.

Comparative Example 10

A polyester-based powder coating composition and a coated plate were produced in the same manner as in Example 3 except that 10 parts of the multilayer polymer particle K was added in place of the multilayer polymer particle A.

Comparative Example 11

An epoxy-based powder coating composition and a coated plate were produced in the same manner as in Example 1 except that 10 parts of the multilayer polymer particle L was added in place of the multilayer polymer particle A.

Results of performance evaluation of the powder coating compositions and the coated plates obtained in Examples 1 to 14 and Comparative Examples 1 to 11 are summarized in Tables 2 and 3.

Testing Method of Characteristics of Powder Coating

Appearance: Appearance of a coat film was observed visually and evaluated.

Anti-blocking property: Degree of agglomeration of a powder coating after the storage at 40° C. for 28 days was observed visually and evaluated as follows.
○: There was no agglomerate and fluidity was good.
Δ: There was an agglomerate which could be loosened easily.
X: There was an agglomerate which could not be loosened.

Testing Method of Properties of Coat Film
Erichsen: An indentation length at a time when a crack appeared in a coat film was measured using an Erichsen tester in accordance with JIS K 5400.

Impact resistance: Height of a position from which a φ½-inch and 1-kg weight was fell down onto a coat film to cause cracking or scaling in the coat film was measured by a DuPont impact test in accordance with JIS K 5400.

Workability (flexibility): A coated plate was bent 180 degrees by a bending tester in accordance with JIS K5400 and the bent portion was observed by a loupe with a magnification of ×20. A shortest inside diameter (mm) at the bent portion in which no crack appeared was measured.

TABLE 2

Blending components of powder coating compositions and results of performance evaluations (1)

| | | Example No. | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| Resin | Epicron 4055RP | 55.3 | 29.4 | 3.0 | 3.0 | 3.0 | 3.0 | 3.0 | 3.0 | 3.0 | 3.0 | 3.0 | 3.0 | | |
| | Finedic M-8050 | | | 46.7 | 46.7 | 46.7 | | 46.7 | 46.7 | 46.7 | 46.7 | 46.7 | 46.7 | | |
| | Finedic A-224S | | | | | | 47.3 | | | | | | | | |
| | Upicacoat GV-230 | | | | | | | | | | | | | 47.1 | 47.1 |
| Curing agent | ADH | 4.2 | | | | | | | | | | | | | |
| | YUBIKACOAT GV-230 | | 29.4 | | | | | | | | | | | | |
| | VESTAGON B-1530 | | | 9.3 | 9.3 | 9.3 | | 9.3 | 9.3 | 9.3 | 9.3 | 9.3 | 9.3 | | |
| | DDA | | | | | | 8.7 | | | | | | | | |
| | ARALDITE PT-810 | | | | | | | | | | | | | 6.3 | 6.3 |
| Flow modifier | Acronal 4F | 0.5 | 0.5 | 0.5 | 0.5 | 0.5 | 0.5 | 0.5 | 0.5 | 0.5 | 0.5 | 0.5 | 0.5 | 0.5 | 0.5 |
| Others | TPP | | 0.2 | | | | | | | | | | | | |
| | Benzoin | | 0.5 | 0.5 | 0.5 | 0.5 | 0.5 | 0.5 | 0.5 | 0.5 | 0.5 | 0.5 | 0.5 | | |
| | ARALDITE DT-312 | | | | | | | | | | | | | 3.1 | 3.1 |
| Pigment | TIPAQUE CR-90 | 40.0 | 40.0 | 40.0 | 40.0 | 40.0 | 40.0 | 40.0 | 40.0 | 40.0 | 40.0 | 40.0 | 40.0 | 40.0 | 40.0 |
| Multilayer polymer | A (Production Example 1) | 10.0 | 10.0 | 5.0 | 10.0 | 20.0 | 10.0 | | | | | | | | |
| | B (Production Example 2) | | | | | | | 5.0 | 10.0 | 20.0 | | | | | |
| | C (Production Example 3) | | | | | | | | | | 10.0 | | | | |
| | D (Production Example 4) | | | | | | | | | | | 10.0 | | | |
| | E (Production Example 5) | | | | | | | | | | | | 10.0 | | |
| | F (Production Example 6) | | | | | | | | | | | | | 10.0 | |
| | G (Production Example 7) | | | | | | | | | | | | | | 10.0 |
| | H (Production Example 8) | | | | | | | | | | | | | | |
| | I (Production Example 9) | | | | | | | | | | | | | | |
| | J (Production Example 10) | | | | | | | | | | | | | | |
| | K (Production Example 11) | | | | | | | | | | | | | | |
| | L (Production Example 12) | | | | | | | | | | | | | | |
| | Anti-blocking property (40° C. 1 month) | ○ | ○ | ○ | ○ | ○ | ○ | ○ | ○ | ○ | ○ | ○ | ○ | ○ | ○ |
| Properties of coat film | Appearance | good | good | good | good | good | good | good | good | good | good | good | good | good | good |
| | Thickness of coat film (μm) | 50–70 | 50–70 | 50–70 | 50–70 | 50–70 | 50–70 | 50–70 | 50–70 | 50–70 | 50–70 | 50–70 | 50–70 | 50–70 | 50–70 |
| | Erichsen (mm) | 8 | 8 | 8 | 8 | 8 | 8 | 8 | >8 | >8 | >8 | 8 | 8 | 8 | >8 |
| | FImpact strength (cm) | 50 | 50 | 45 | 50 | 50 | 50 | 50 | 50 | 50 | 50 | 50 | 50 | 50 | 50 |
| | Flexibility (φmm) | 2 | 0 | 4 | 2 | 0 | 2 | 2 | 0 | 0 | 0 | 2 | 2 | 2 | 2 |

TABLE 3

Blending components of powder coating compositions and results of performance evaluations (2)

| | | Comparative Example No. | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Resin | Epicron 4055RP | 55.3 | 29.4 | 3.0 | 3.0 | | 3.0 | 3.0 | 3.0 | 3.0 | 3.0 | 55.3 |
| | Finedic M-8050 | | | 46.7 | | | 46.7 | 46.7 | 46.7 | | 46.7 | |
| | Finedic A-224S | | | | 47.3 | | | | | 47.3 | | |
| | Upicacoat GV-230 | | | | | 47.1 | | | | | | |
| Curing agent | ADH | 4.2 | | | | | | | | | | 4.2 |
| | YUBIKACOAT GV-230 | | 29.4 | | | | | | | | | |
| | VESTAGON B-1530 | | | 9.3 | | | 9.3 | 9.3 | 9.3 | | 9.3 | |
| | DDA | | | | 8.7 | | | | | 8.7 | | |
| | ARALDITE PT-810 | | | | | 6.3 | | | | | | |

TABLE 3-continued

Blending components of powder coating compositions and results of performance evaluations (2)

| | | Comparative Example No. | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Flow modifier | Acronal 4F | 0.5 | 0.5 | 0.5 | 0.5 | 0.5 | 0.5 | 0.5 | 0.5 | 0.5 | 0.5 | 0.5 |
| Others | TPP | | 0.2 | | | | | | | | | |
| | Benzoin | | 0.5 | 0.5 | 0.5 | | 0.5 | 0.5 | 0.5 | 0.5 | 0.5 | |
| | ARALDITE DT-312 | | | | | 3.1 | | | | | | |
| Pigment | TIPAQUE CR-90 | 40.0 | 40.0 | 40.0 | 40.0 | 40.0 | 40.0 | 40.0 | 40.0 | 40.0 | 40.0 | 40.0 |
| Multilayer polymer | A (Production Example 1) | | | | | | | | | | | |
| | B (Production Example 2) | | | | | | | | | | | |
| | C (Production Example 3) | | | | | | | | | | | |
| | D (Production Example 4) | | | | | | | | | | | |
| | E (Production Example 5) | | | | | | | | | | | |
| | F (Production Example 6) | | | | | | | | | | | |
| | G (Production Example 7) | | | | | | | | | | | |
| | H (Production Example 8) | | | | | | 10.0 | | | | | |
| | I (Production Example 9) | | | | | | | 10.0 | | | | |
| | J (Production Example 10) | | | | | | | | 10.0 | | | |
| | K (Production Example 11) | | | | | | | | | | 10.0 | |
| | L (Production Example 12) | | | | | | | | | | | 10.0 |
| | Anti-blocking property (40° C., 1 month) | ○ | ○ | ○ | ○ | ○ | ○ | Δ | Δ | Δ | Δ | Δ |
| Properties of coat film | Appearance | good | good | good | good | good | good | Orange Peel-like | Orange Peel-like | good | Orange Peel-like | dull |
| | Thickness of coat film (μm) | 50–70 | 50–70 | 50–70 | 50–70 | 50–70 | 50–70 | 50–70 | 50–70 | 50–70 | 50–70 | 50–70 |
| | Erichsen (mm) | 5 | 7 | 8 | 7 | 8 | 5 | 5 | 6 | 8 | 6 | 5 |
| | Impact strength (cm) | 30 | 40 | 40 | 30 | 40 | 35 | 35 | 35 | 45 | 40 | 45 |
| | Flexibility (φmm) | 8 | 4 | 6 | 4 | 4 | 8 | 6 | 4 | 4 | 4 | 6 |

As shown in Tables 2 and 3, in Examples 1 to 14 in which the multilayer polymer particles A to G were added, Erichsen, impact strength and workability of each powder composition have been remarkably improved comparing with those attained in Comparative Examples 1 to 5 in which no multilayer polymer particle was added, and particularly an excellent improving effect on workability has been observed. In Examples 7 to 10 in which the multilayer polymer particles B and C whose second layer was modified with HEMA was used, workability and impact strength have been improved comparing with those observed in Examples 3 to 5 in which the unmodified multilayer polymer particle A was used, and an effect caused by the modification with a monomer having a hydroxyl group has been observed. On the other hand, in Comparative Example 6 in which the multilayer polymer particle H having no layer with a Tg of not over 20° C. was used, no improving effect on properties of a coat film has been observed. In Comparative Examples 7 to 11 in which the multilayer polymer particle I having no second layer with a Tg of not less than 60° C., the multilayer polymer particle J in which either a crosslinking monomer or a grafting monomer was not copolymerized in the polymer layer having a Tg of not over 20° C., the multilayer polymer particle K in which only a small amount of crosslinking monomer and grafting monomer were used and the multilayered polymer particle L in which has no grafting monomer were employed, there has been observed only a small improving effect on workability, and both appearance of the coat films and anti-blocking property of the powder coatings have been deteriorated.

Example 15

In a reactor for esterification, 913 g of isophthalic acid, 748 g of telephthalic acid, 1015 g of neopentyl glycol, 279 g of ethylene glycol and 260 g of multilayer polymer particle B were added, and the mixture was subjected to polymerization reaction under pressure of 0.05 to 0.25 MPa, at a temperature of 200 to 260 ° C. for 4 hours. After addition of 0.6 g of antimony trioxide, the polycondensation reaction was continued under a reduced pressure of 0.4 hPa at 280° C., for 4 hours. To the reaction mixture, 53.6 g of trimethylolpropane was added, and the reaction was continued at 270° C. for 1 hour to give polyester resin(1) in which the multilayer polymer particle B was dispersed.

In a high-speed mixer, 3.0 parts of EPICLON 4055RP, 56.0 parts of the polyester resin(1) obtained above in which 10 parts of multilayer polymer particle B, 7.3 parts of VESTAGON B-1530, 0.5 parts of Acronal 4F, 0.5 parts of benzoin and 40.0 parts of TIPAQUE CR-90 were blended, and then melt-kneaded in an extruder at 110° C. After cooling, the resulting mixture was finely ground by a pulverizer, and a fraction which passed though a 150-mesh sieve was collected to give a polyester-based powder coating composition, the multilayer polymer particle B dispersed therein.

A coated plate was produced by applying the powder coating composition obtained above to a cold rolled steel plate by electrostatic powder coating so that a thickness of a coat film would become 50 to 70 μm, and curing it under a condition of at 190° C. for 20 minutes.

Results of performance evaluation of the powder coating composition and the coated plate tested according to the afore-mentioned test methods are shown below.

| | |
|---|---|
| Anti-blocking property (40° C., 1 month): | ○ |
| Appearance: | good |
| Thickness of coat film (μm): | 50–70 |
| Erichsen (mm): | >8 |

| | |
|---|---|
| Impact strength (cm): | 50 |
| Flexibility (φ mm): | 0 |

EFFECT OF THE INVENTION

The powder coating composition of the present invention is adaptable for various powder coatings such as a polyester-based, a polyester-epoxy hybrid-based, an acrylic-based and an epoxy-based powder coatings, and can remarkably improve workability after coating as well as impact resistance while maintaining inherent properties of these powder coatings such as appearance and anti-blocking property.

We claim:

1. A thermosetting powder coating composition, comprising:
a plurality of multilayer polymer particles, in which at least one inner-layer of said particles is a polymer layer having a glass transition temperature (Tg) of not over 20° C. and in which the outermost layer of said particles is a polymer layer having a Tg of not less than 60° C., wherein said at least one inner layer is formed from monomer components having at least one unsaturated double bond in the molecules, said monomer components including a crosslinking monomer and a grafting monomer used in an amount of 0.3 to 5 weight % and of 1 to 10 weight %, respectively,
a base resin, and
a curing agent,
wherein said composition contains 1 to 30 parts by weight of said multilayer polymer particles per 100 parts by weight of the total components of said composition other than the multilayer polymer particles and is in the form of dry powder.

2. The thermosetting powder coating composition according to claim 1, wherein the outermost layer of the multilayer polymer particles is modified with 0.5 to 35 weight % of a monomer having at least one carboxyl group or hydroxy group in its molecule based on the whole outermost layer.

3. The thermosetting powder coating composition according to claim 1 or claim 2, wherein the base resin is a polyester resin having a softening point of 60° C. to 150° C.

4. The thermosetting powder coating composition according to claim 1 or claim 2, wherein the base resin is an acrylic resin having a softening point of 60° C. to 1 50° C.

5. The thermosetting powder coating composition according to claim 1 or claim 2, wherein the base resin is an epoxy resin having a softening point of 60° C. to 150° C.

6. The thermosetting powder coating composition according to claim 1 or claim 2, wherein the base resin is an epoxy-polyester hybrid resin.

7. The thermosetting powder coating composition according to claim 1, wherein a weight average diameter of the multilayer polymer particles is 0.05 to 5 μm.

8. The thermosetting powder coating composition according to claim 1, wherein a proportion of the polymer layer having a Tg of not over 20° C. contained in the multilayer polymer particles is 30 to 98 weight % per the whole multilayer polymer particles.

9. A process for producing a thermosetting powder coating composition, which comprises:
mixing components of the composition, the components comprising a plurality of multilayer polymer particles, in which at least one inner layer of said particles is a polymer layer having a glass transition temperature (Tg) of not over 20° C. and in which the outermost layer of said particles is a polymer layer having a Tg of not less than 60° C., wherein said at least one inner layer is formed from monomer components having at least one unsaturated double bond in the molecules, said monomer components including a crosslinking monomer and a grafting monomer used in an amount of 0.3 to 5 weight % and of 1 to 10 weight %, respectively, a base resin, and a curing agent, to form a mixture,
wherein said mixture contains 1 to 30 parts by weight of said multilayer polymer particles per 100 parts by weight of the total components of said mixture other than the multilayer polymer particles,
melt-blending the mixture at a temperature higher than a softening point of the base resin,
pulverizing, and classifying the resultant mixture, to obtain the composition in the form of a dry powder.

10. The process for producing a thermosetting powder coating composition according to claim 9, wherein the outermost layer of the multilayer polymer particles is modified with 0.5 to 35 weight % of a monomer having at least one carboxyl group or hydroxyl group in its molecule based on the whole outermost layer.

11. The process for producing a thermosetting powder coating composition according to claim 9, wherein the melt-blending is carried out at a temperature of 50° C. to 130° C.

12. The process for producing a thermosetting powder coating composition according to claim 9, wherein the base resin is a polyester resin having a softening point of 60° C. to 150° C.

13. The process for producing a thermosetting powder coating composition according to claim 9, wherein the base resin is an acrylic resin having a softening point of 60° C. to 150° C.

14. The process for producing a thermosetting powder coating composition according to claim 9, wherein the base resin is an epoxy resin having a softening point of 60° C. to 150° C.

15. The process for producing a thermosetting powder coating composition according to claim 9, wherein the base resin is an epoxy-polyester hybrid resin.

16. The process for producing a thermosetting powder coating composition according to claim 9, wherein a weight average diameter of the multilayer polymer particles is 0.05 to 5 μm.

17. The process for producing a thermosetting powder coating composition according to claim 9, wherein a proportion of the polymer layer having a Tg of not over 20° C. contained in the multilayer polymer particles is 30 to 98 weight % per the whole multilayer polymer particles.

* * * * *